(12) United States Patent
Benito-Navazo

(10) Patent No.: US 6,536,718 B2
(45) Date of Patent: Mar. 25, 2003

(54) PRESSURE PLUG FOR SUPPORTING ELECTRIC CABLES

(75) Inventor: Juan Manuel Benito-Navazo, Barcelona (ES)

(73) Assignee: Aparellaje Electrico, S.L., Barcelona (ES)

(*) Notice: Subject to any disclaimer, the term of this patent is extended or adjusted under 35 U.S.C. 154(b) by 0 days.

(21) Appl. No.: 10/029,978

(22) Filed: Dec. 31, 2001

(65) Prior Publication Data

US 2002/0088637 A1 Jul. 11, 2002

(30) Foreign Application Priority Data

Jan. 11, 2001 (ES) .......................................... 200100054

(51) Int. Cl.⁷ ................................................ F16B 15/00
(52) U.S. Cl. .................. 248/71; 248/224.8; 248/231.9; 411/400; 411/510
(58) Field of Search ................. 248/71, 74.5, 74.4, 248/74.3, 65, 231.9, 224.8; 411/510, 400; 174/656

(56) References Cited

U.S. PATENT DOCUMENTS

| 4,609,170 A | | 9/1986 | Schnabl ........................ 248/71 |
|---|---|---|---|
| 4,900,210 A | * | 2/1990 | Buchanan et al. ........... 411/392 |
| 5,203,529 A | * | 4/1993 | Penniman ............... 248/222.11 |
| 5,636,937 A | * | 6/1997 | Zemlicka ............... 248/222.11 |
| 5,765,787 A | * | 6/1998 | de Beers et al. .......... 248/316.7 |
| 5,803,414 A | * | 9/1998 | Wright .......................... 248/71 |
| 5,820,048 A | * | 10/1998 | Shereyk et al. ................ 24/487 |
| 5,906,465 A | | 5/1999 | Sato et al. ................... 411/510 |
| 6,371,419 B1 | * | 4/2002 | Ohnuki ......................... 248/71 |

FOREIGN PATENT DOCUMENTS

FR    2450969    10/1980

* cited by examiner

Primary Examiner—Ramon O. Ramirez
(74) Attorney, Agent, or Firm—Staas & Halsey LLP

(57) ABSTRACT

A pressure plug for supporting electric cables, of the type that is forced into a hole formed in a wall and including a flattened head, a passage for receiving a fastening member therein, and a rigid shaft provided along the entire length thereof, except over a short thicker portion, where it is connected to the head, with a plurality of annular ribs that are identical and equidistantly spaced apart. Each and every one of the annular ribs has two or more radial gaps that, in mutual linear correspondence, define a like number of longitudinal slots.

4 Claims, 1 Drawing Sheet

PRESSURE PLUG FOR SUPPORTING ELECTRIC CABLES

FIELD OF THE INVENTION

The present invention refers to a pressure plug for supporting electric cables, particularly one of the type that is forced under percussion into a hole purposely formed in a wall and while being formed by a integral member made from synthetic plastics material, is formed by differentiated portions such as a flattened head, provided with means for the insertion of a flexible tie or another binding element, and a rigid shaft provided along the entire length thereof, except over; a short thicker portion, where it is connected to the said head, with a plurality of flanges or annular ribs that are identical and equidistantly spaced apart.

PRIOR ART

These plugs, as said above, are attached to a wall by inserting them under pressure in a hole purposely formed in the wall. To achieve a stable fixation it is necessary that the diameter of said hole should be slightly smaller than the diameter of the annular ribs so that these annular ribs are forced to reduce their diameter and adapt themselves to the diameter of the hole, which they do by deformation of the annular plane thereof and adoption of a undulating configuration therefor, in a curved or gathered style.

This undulating curved or gathered configuration is the result of a completely irregular distribution that does not assure the stability of fixation, since each annular rib will deform in a different way depending on the direction of the percussion, the hardness of the material in the different layers thereof inside the hole in the wall and on whether the hole has been correctly made, both with regard to the plug/hole diameter relationship and in the inclination thereof relative to the plane of the wall.

SUMMARY OF THE INVENTION

With the purpose of assuring the stable fixation of the plug under any circumstances whatsoever, the solution has been adopted of forming the annular ribs in such a way that, when inserting the plug in the hole appropriate for the purpose, the annular ribs are deformed in a regular way like a barbed arrangement.

In accordance with the foregoing solution, the pressure plug for supporting electric cables has been developed, according to which each and every one of the annular ribs has two or more mutually linearly aligned radial gaps that define a like number of longitudinal slots.

A characteristic of the invention is that the radial gaps of the annular ribs determining the longitudinal slots are regularly arranged.

Another characteristic of the invention is to be found in that the number of longitudinal slots is such that it allows the gapped annular ribs to have, in each case, a sufficient capacity of anchorage in the hole.

Finally, the invention contemplates that the longitudinal slots are preferably distributed according to an arrangement of the group formed by diametrical opposition, separation at 120°, separation at 90°, separation at 72°, separation at 60° and separation at 45°.

BRIEF DESCRIPTION OF THE DRAWINGS

To facilitate the understanding of the foregoing ideas, there is described herein below the object of the invention, with reference to the accompanying illustrative drawings, in which.

DETAILED DESCRIPTION OF THE INVENTION

Figure 1:
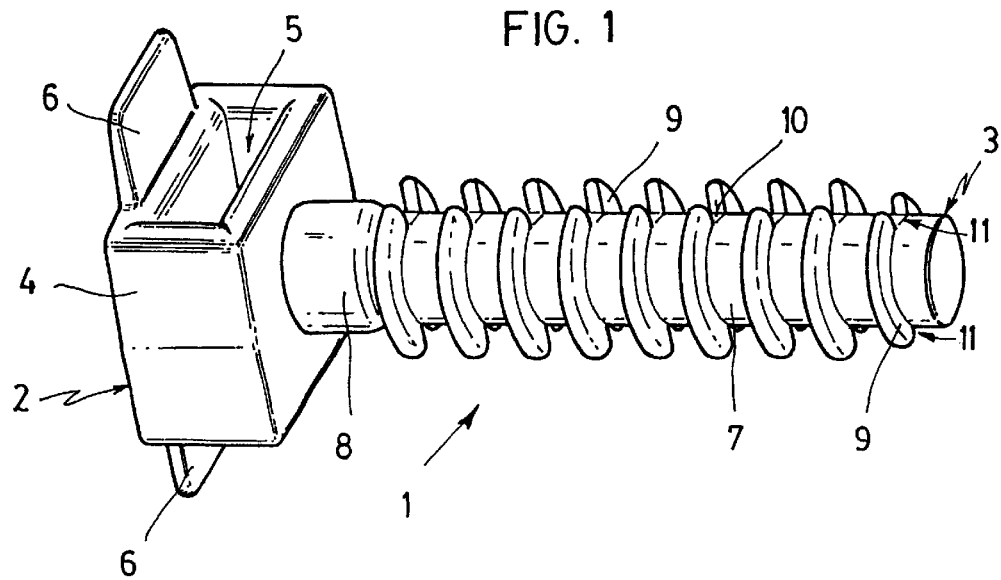
FIG. 1 is side perspective view of a pressure plug according to the invention.
Figure 2:
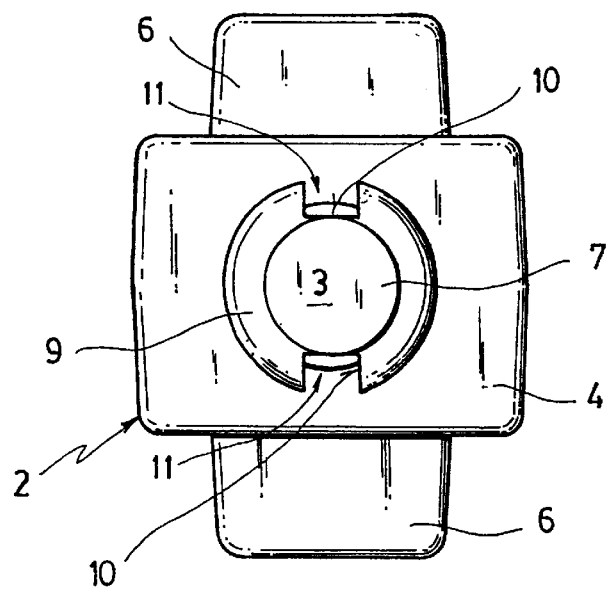
FIG. 2 is an elevation view of the pressure plug of FIG. 1.

The pressure plug 1, shown by way of example in the drawings, comprises a head portion 2 and a body portion 3.

The head portion 2 is formed by a hollow parallelepipedic body 4 having a through opening between two median open surfaces 5 and two flexible tabs 6 extending from two opposite sides of the outer larger surface, while the body portion 3 is formed by a rigid shaft 7 provided with a short portion 8, thicker than the rest, which is connected to the head portion 2 and with a plurality of identical equidistantly spaced apart annular ribs 9 each having two or more mutually lineally aligned radial gaps 10 defining a like number of longitudinal slots 11.

These longitudinal slots are preferably distributed according to an arrangement of the group formed by diametrical opposition, adopted in the plug shown in the drawings, and separation at 45°, 60°, 72°, 90° and 120°.

The number of longitudinal slots is such that it allows the gapped annular ribs 9 to have, in each case, the appropriate capacity of anchorage in the hole in the wall.

Evidently, with the novel arrangement of the gapped annular ribs 9, they will be deformed evenly inside the hole in a semi-frustoconical form and having the nature of a barbed arrangement directed in a direction opposed to that of removal of the plug, whereby the plug 1 will be highly stable when embedded in the wall.

What I claim is:

1. A pressure plug for supporting electric cables, of the type that is pushed into a hole in a wall, comprising an integral member made from synthetic plastics material including a flattened head provided with a passage for receiving a fastening member therethrough to secure an electric cable to be positioned adjacent the head, said passage opening on opposite sides of the head, and a rigid shaft provided along an entire length of the plug, except over a short thicker portion connected to the head, and a plurality of annular ribs that are identical and equidistantly spaced apart formed on the shaft, wherein each and every one of the annular ribs has at least two radial gaps that, in mutual linear correspondence, define a like number of longitudinal slots along the shaft.

2. The plug according to claim 1, wherein the radial gaps of the annular ribs that determine the longitudinal slots are regularly arranged.

3. The plug according to claim 2, wherein the longitudinal slots are distributed in diametrical opposition, separated at one of 120°, 90°, 72°, 60° and 45°.

4. The plug according to claim 1, wherein the number of longitudinal slots is such that it allows the gapped annular ribs to have, in each case, sufficient anchorage in the hole.

* * * * *